Jan. 10, 1961 R. D. McCOY 2,967,997

METHOD AND APPARATUS FOR CHECKING
ELECTRONIC ANALOG COMPUTERS
Filed April 20, 1955

INVENTOR
RAWLEY D. McCOY
BY
Burgess, Ryan & Hicks
ATTORNEYS

United States Patent Office 2,967,997

Patented Jan. 10, 1961

2,967,997

METHOD AND APPARATUS FOR CHECKING ELECTRONIC ANALOG COMPUTERS

Rawley D. McCoy, Bronxville, N.Y., assignor to Reeves Instrument Corporation, New York, N.Y., a corporation of New York Filed Apr. 20, 1955, Ser. No. 502,645

14 Claims. (Cl. 324—73)

The present invention relates to electronic computers and relates, more particularly, to a method and apparatus for checking electronic analog computers.

An object of the invention is to provide a method and apparatus by means of which the connections, settings and functioning of the various components of an electronic computer may be readily checked and verified. In accordance with the present invention, such a check may be repeated as often as desired without disturbing the connections or setup of the computer.

Another object of the invention is to provide a method and apparatus for checking an electronic computer by means of which any difficulties or mal-functioning will be localized and can be quickly corrected.

A further object of the present invention is to provide a method and apparatus for checking an electronic computer which may be incorporated in new computer equipment or in existing computer equipment at low cost. Another object of the invention is to provide a method and apparatus for checking an electronic computer which requires a minimum of computation by the operator.

Electronic computers are recognized today as being indispensible tools in the field of Dynamic Systems Engineering. Generally speaking, present day electronic computers have excellent accuracy, but this accuracy is meaningful only if the computer setup which includes problem coding, patch connections and scale factor potentiometer settings are free from error and the components of the computer are operating properly. In setting up a computer for the solution of a particular problem, several hundred or more connections and settings may have to be made by the operator and there is always the possibility of human error in addition to the possibility of improper operation of the components in the computer. Hence, it is of the utmost importance to be able to check the operation of the computer after it has been set up for the solution of a particular problem in order to establish the validity of the results obtained.

Figure 1:
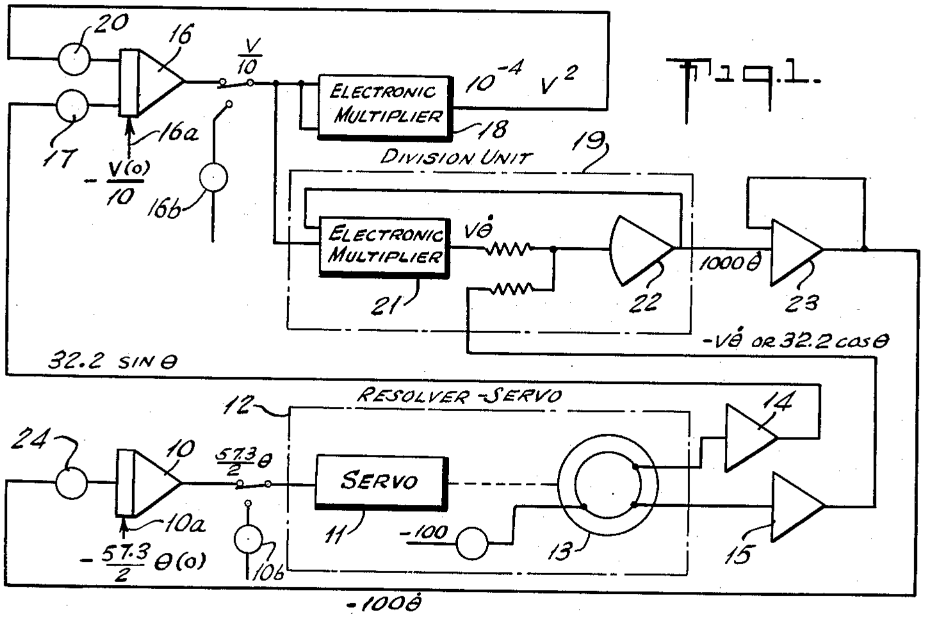
Figure 2:
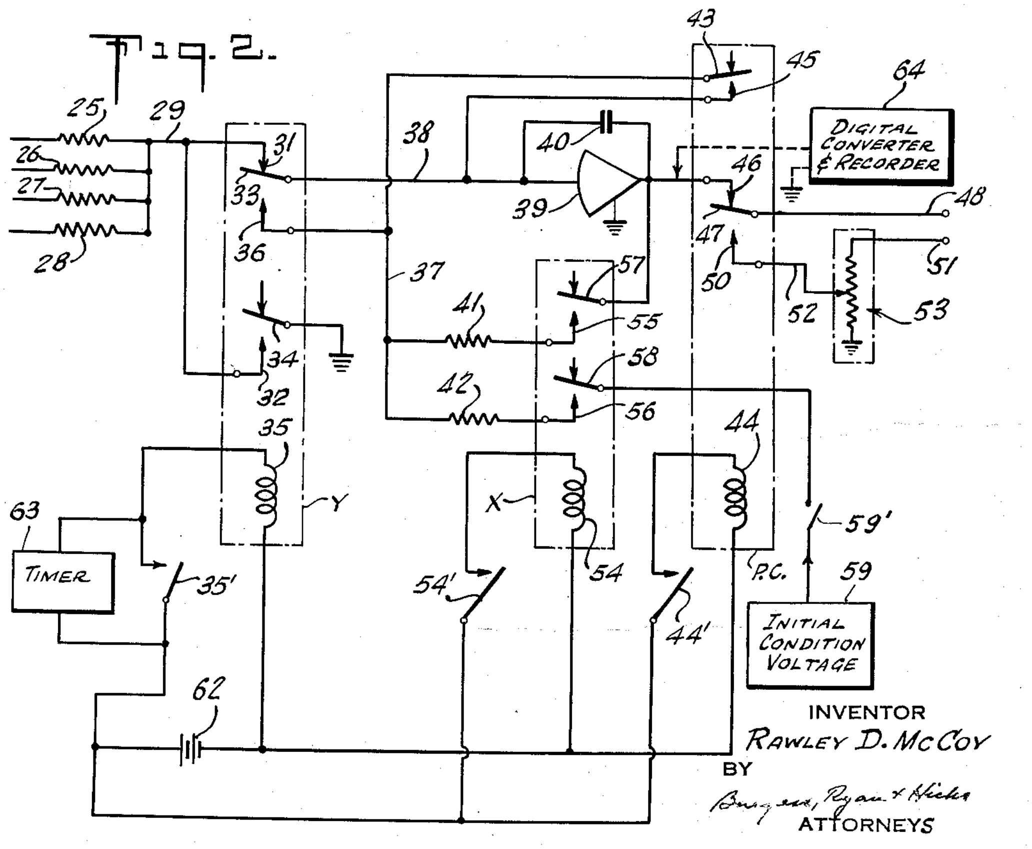

Other objects and advantages of the present invention will be apparent and best understood from the following description and the accompanying drawing, in which:

Fig. 1 is a block diagram illustrating an electronic analog computer system embodying the present invention; and Fig. 2 is a schematic circuit diagram of an integrator embodying the present invention for use in an electronic analog computer system such as shown in Fig. 1.

Referring to the drawings in detail, Fig. 1 illustrates an electronic analog computer which has been set up for the solution of the following equations:

$$\frac{dV}{dt}=32.2\sin\theta-8(10^{-5})V^2 \qquad (1)$$

$$V\frac{d\theta}{dt}=32.2\cos\theta \qquad (2)$$

In accordance with accepted nomenclature, $$\frac{dV}{dt}$$

and $$\frac{d\theta}{dt}$$

may also be referred to as $\dot{V}$ and $\dot{\theta}$, respectively. V is velocity in feet per second and $\theta$ is angle in degrees or radians.

In the computer circuit shown in Fig. 1, there is an integrator 10 which has its output connected to a servo 11 of a resolver-servo unit 12. The resolver 13 of the resolver-servo unit 12 has two outputs which are connected to inverter amplifiers 14 and 15, respectively. The output of the amplifier 14 is connected to an input of a second integrator 16 through a scale factor potentiometer 17.

The output of the integrator 16 is fed to an electronic multiplier 18 and to an electronic division circuit 19. The output of the electronic multiplier 18 is returned to an input to the integrator 16 through a scale factor potentiometer 20.

The electronic division circuit includes an electronic multiplier 21 and a high gain summing amplifier 22. The output of the integrator 16 is connected to the multiplier 21 in the division circuit and the output of the multiplier is connected to the input to the high gain amplifier 22. The output of the inverter amplifier 15 is also connected to the input to the high gain amplifier 22 in the division circuit and the output of the high gain amplifier is returned to the multiplier 21. The output of the high gain amplifier which is the output of the division circuit, is also fed through an inverting an attenuating amplifier 23 to the input of the integrator 10 through a scale factor potentiometer 24.

The symbols used in Fig. 1 are conventional symbols for computer circuits. The electronic multipliers 18 and 21 may be of the type shown in U.S. Patent application Serial No. 294,752, filed June 6, 1952, in the names of Rawley D. McCoy and Leo Wiesner and entitled Electronic Multiplier and Divider, now Patent 2,839,244.

Under certain conditions in the checking mode of operation, as will be described hereinafter, the outputs of the integrators 10 and 16 are disconnected from the circuit and check voltages of predetermined values are substituted in the computer circuit in place thereof from potentiometers **10*b* and 16*b***, respectively.

To condition the computer for operation, constant initial condition input voltages representing $\theta$ and V at time zero are introduced into the integrators 10 and 16, respectively, as indicated at **10*a* and 16*a*. During normal operation of the computer, the inputs 10*a* and 16*a*** are disconnected from the integrators.

The initial condition voltages $\theta$ and V will depend on the characteristics of the computer and in this instance the initial condition voltage for integrator 10 will be $$-\frac{57.3}{2}\theta_{(0)}$$

and the initial condition voltage for integrator 16 will be $$-\frac{V_{(0)}}{10}$$

The integrators 10 and 16 are so designed that their outputs will be the same as the initial condition voltages applied thereto except for sign.

In the computer circuit illustrated in Fig. 1, the output of the integrator 10 will be $$\frac{57.3}{2}\theta$$

The output of the amplifiers 14 and 15 will be 32.2 sin $\theta$ and 32.2 cos $\theta$, respectively, and the output of the integrator 16 will be $$\frac{V}{10}$$

The output of the multiplier 18 will be $10^{-4}V^2$ and the output of the division circuit will be 1000 $\theta$. The output of the amplifier 23 will be $-100$ $\theta$.

The outputs of the various components may be calculated and compared with the actual values obtained from the computer under such initial conditions, but this does not provide a complete check because the integrator connections, inputs and performance are not verified.

Fig. 2 illustrates an integrator circuit which includes means for obtaining both a dynamic and a static check on the operation of the computer including integrators such as the integrators 10 and 16 shown in Fig. 1.

In the circuit shown in Fig. 2, there is a series of precision input resistors 25 to 28, inclusive, through which input voltages may be fed to the integrator in the usual manner. One end of each resistor is connected to a common lead or summing junction 29. The summing junction is connected to fixed contacts 31 and 32 of a relay designated by the letter Y. The relay Y has two movable contacts 33 and 34 and an energizing coil 35. When the relay coil 35 is de-energized, the movable contact 33 engages with the contact 31 and the contact 32 is open. When the relay coil 35 is energized, the movable contact 33 is shifted into engagement with a fixed contact 36 and the movable contact 34 engages with the fixed contact 32.

In normal operation of the integrator, the relay coil 35 is de-energized and the input to the integrator is connected through contacts 31 and 33 and a lead 38 to the input of an amplifier 39 which has a feedback condenser 40 connected across it in the usual manner to function as an integrator.

The other movable contact 34 of the relay Y is connected to ground. When the relay is energized, the input voltage is connected to ground through the contacts 32 and 34. At the same time, the input to the integrating amplifier is connected through the contacts 33 and 36 to a lead 37. The lead 37 is connected to one side of each of a pair of resistors 41 and 42 and also to a movable contact 43 of a second relay designated by the letters P.C. having an energizing coil 44.

When the coil 44 is de-energized, the movable contact 43 is open. When the coil 44 is energized, the movable contact 43 engages with a fixed contact 45 and thus connects one side of the resistors 41 and 42 to the input to the amplifier 39.

The relay P.C. also includes a fixed contact 46 which is connected to the output of the integrating amplifier 39 and a movable contact which is connected through a lead 48 to the computer. The movable contact 47 engages with the contact 46 when the relay is de-energized and connects the output of the amplifier to the computer circuit. When the relay P.C. is energized, the movable contact 47 is shifted from the contact 46 to a second fixed contact 50 which is connected by a lead 52 to an adjustable voltage divider 53 in the form of a potentiometer which in turn is connected to a source of fixed voltage 51. Thus, upon energization of the relay, the output of the amplifier is disconnected from the computer and a predetermined voltage from the potentiometer is substituted therefor in the computer.

A third relay denoted by the letter X having an energizing coil 54 is also connected in the integrator circuit for use in the checking operations. The relay X has two fixed contacts 55 and 56 which are connected to the resistors 41 and 42, respectively. The fixed contacts are open when the relay coil 54 is de-energized. When the relay coil 54 is energized, a movable contact 57 which is connected to the output of the integrating amplifier 39 engages with the fixed contact 55 and a movable contact 58 which is connected to an initial condition voltage source 59 engages with the other fixed contact 56 of the relay.

When either the first relay Y or the second relay P.C. are energized and the third relay X is energized at the same time, the resistor 41 is connected as a feedback resistor across the input and output of the amplifier 39 and cancels the integrating effect of the feedback condenser 40.

An initial condition voltage may also be applied to the input to the integrating amplifier 39 from a source 59 through contacts 56 and 58 of the relay X and the resistor 42 in order to condition the computer for operation. It should be noted, however, that the initial condition voltage source 59 is disconnected by a switch 59′ from the relay X during problem check and balance check of the computer as described hereinafter.

The operation of the relays Y, P.C., and X may be controlled by suitable switches 35′, 44′, and 54′ which connect the coils of the respective relays to a source of energy such as a battery 62. In addition, a suitable timing device 63 is provided to control the operation of the relay Y during part of the checking operation and is arranged to energize the coil 35 of the relay Y after a predetermined period of computer operation. It will be understood that one such timing device may be used to control the relays of the several integrators in a computer.

In order to facilitate the checking operation, a read-out device 64 such as a digital converter and recording system is used to measure the output of the integrator. Such a device may be arranged to selectively measure the outputs of the various components in the computer in a desired sequence and to print and record such outputs automatically so that the outputs obtained may be compared with calculated values.

The conditions for operation of the relays to perform both a static and dynamic check of a computer are set forth in the following table.

| Relay | Prob. Ck. Static | Prob. Ck. Dynamic | |
|---|---|---|---|
| | | Oper. | Hold |
| X | E | D | D |
| Y | D | D | E |
| P.C. | E | E | E |

E denotes relay energized.
D denotes relay de-energized.

After the computer has been connected with the proper settings for the computation of a particular problem, a static problem check is first carried out. Under such conditions, the relay P.C. is energized and a constant problem check voltage from the potentiometer 53 is substituted in the computer for the output of the integrator. The relay X is also energized and thus, the amplifier does not function as an integrator. This is done for each integrator in the computer and with the introduction of these constant voltages, output voltages will appear at each component in the computer, the values of which may be read and recorded by the read-out device. Under these conditions, the outputs of the integrators will be proportional to the initial value of the derivatives applied thereto.

Assume problem check initial conditions of V equal to 1000 ft./sec. and $\theta$ equal to ⅓ radian and with the capacity of the condenser 40 being 1 mfd. and the value of the resistor 41 being 1 megohm, the correct outputs for the computing elements will be:

| | Output Factor | Output (Volts) |
|---|---|---|
| Integrator 10 | $\frac{57.3}{2}\dot{\theta}$ | 0.87 |
| Integrator 16 | $\frac{\dot{V}}{10}$ | 9.06 |
| Amplifier 14 | 32.2 sine $\theta$ | 10.5 |
| Amplifier 15 | 32.2 cos $\theta$ | 30.4 |
| Amplifier 22 | 1000 $\dot{\theta}$ | −30.4 |
| Amplifier 23 | −100 $\dot{\theta}$ | 3.04 |
| Multiplier 18 | $10^{-4}V^2$ | 100.0 |
| Multiplier 21 | $V\dot{\theta}$ | −30.4 |

It will be noted that the outputs of integrators 10 and 16 are proportional to the initial value of the derivative of the normal integrator output. The values of the derivatives $\dot{V}$ and $\dot{\theta}$ are determined from the Equations 1 and 2, respectively.

In order to verify the operation of certain nonlinear elements, such as limiters or function generators, and to establish reasonable levels for all of the variables in a system of equations, it may be desirable to insert several values of problem check voltages into the system and this may be done by adjusting the problem check potentiometers without disturbing other connections.

The dynamic problem check is then carried out and in making a dynamic problem check the relay Y is shifted from an operate to a hold position, as indicated in the table. In the operate position, the relay Y is de-energized and the input voltages from the computer are fed to the amplifier 39 and an output voltage is produced. However, the relay P.C. is energized and the problem check initial condition voltage is substituted in the computer circuit in place of the integrator output. During this portion of the operation, each integrator performs its integrating function for a fixed interval of time as determined by the timer 63 and after the predetermined interval of time has elapsed the relay Y is energized by the timer operation and is shifted to the hold position. This interrupts the computing process and the outputs of the integrators are recorded by the read-out device.

Since the time of the integrating operation is known and since the output of each integrator is equal to a constant times the initial values of the derivative of the problem variable computed in each integrator, the outputs of the integrators can be directly checked against values calculated from the original equations. For the sample problem with a nine second integration time, these values will be:

| | Output Factor | Voltage |
|---|---|---|
| Integrator 10 | $10\left(\frac{57.3}{2}\dot{\theta}\right)$ | 8.7 |
| Integrator 16 | 10 $\dot{V}$/10 | 90.6 |

(The proportionality factor is ten instead of nine because of the initial charge on the integrating condensers.)

In this mode of operation, the functioning of the integrating condensers 40 in each of the integrating amplifiers 39 used in the computer may be checked and a complete check of every element in the computing system is accomplished including the patch-board connections and adjustments of the scale factor potentiometers. If the outputs from the integrators, as well as the output voltage of other components of the circuit as determined during the static problem check, meet the requirements of the equations being solved, the connections and settings of the computer are verified as being correct.

After the apparatus has been checked both statically and dynamically, normal operating procedures may be followed as indicated in the following table.

| Relay | Bal. Ck. | Reset | Operate | Hold |
|---|---|---|---|---|
| X | E | E | D | D |
| Y | E | E | D | E |
| P.C | D | D | D | D |

The balance check conditions as indicated in the above table is for the purpose of determining that all amplifiers are working properly and are drift-free. This is in effect a maintenance mode of operation. The reset mode of operation provides for the insertion of initial condition voltages into each of the integrators. During the operate mode all of the relays are de-energized for operation of the computer.

As described above, the utilization of three separate relays within the circuit of each integrator in the computer permits the entire computing system to be accurately checked to assure the proper arrangement of the computer components to attain a desired end. While individual switches have been shown as operating the three relays in Fig. 2 of the drawings, it will be understood that corresponding relays in the various integrators in a computer may be simultaneously operated by means of suitable master switches and a single timer may be employed to operate the Y relays in all of the integrators in the computer.

By incorporating the three control relays and the associated circuits in the integrators for a computer, the necessity for manually modifying any computer connections whatsoever in the performance of both the static and the dynamic problem checks is avoided and enables the operator to check the operation of the computer whenever desired by merely operating the appropriate switches. Also, where the computer is provided with so-called "prepatch" boards which enable the connections for the solution of the particular problem to be set up independently of the computer, the connections and operation of the computer can be checked both statically and dynamically and after the check results are obtained the operator can then re-study the particular setup away from the computer which in the meantime may be utilized for other purposes. This procedure greatly increases the usefulness of computers since it is not necessary to occupy the apparatus for extended periods of time to determine the accuracy of a particular setup and locate possible errors therein.

It will be understood that various alterations, modifications and changes may be made in the embodiment of the invention illustrated and described herein without departing from the true scope and spirit thereof.

I claim:

1. In an apparatus for checking the operation of an analog computer which includes an integrator having an input and an output connected in the computer circuit, the combination which comprises means for disconnecting the output of the integrator from the computer circuit and substituting a predetermined voltage in the computer circuit in place thereof, means for disconnecting the input to the integrator from the computer circuit after a predetermined period of operation of the integrator with its output disconnected from the computer circuit, and means for measuring the output of the integrator after said predetermined period of operation.

2. In an apparatus for checking the operation of an electronic analog computer which includes an integrator having an amplifier and a feedback condenser connected across the amplifier, said integrator having an input and an output connected in the computer circuit, the combination which comprises means for disconnecting the output of the integrator from the computer circuit and substituting a constant voltage of a predetermined value in the computer circuit in place thereof, means including a resistor for cancelling the effect of the feedback condenser in the integrator, and means for measuring the output of the integrator when the effect of the condenser is cancelled.

3. In an apparatus for checking the operation of an electronic analog computer which includes an integrator having input and output circuits connected in the computer circuit, the combination which comprises adjustable means connected to a source of constant voltage for providing a voltage, having a predetermined value, means for disconnecting the output of the integrator from the computer circuit and connecting the predetermined voltage from said adjustable means to the computer in place of the integrator output, means for disconnecting the input of the integrator from the computer circuit after a predetermined period of operation of the integrator, and means for measuring the integrator output after said predetermined period of operation.

4. Apparatus for checking the operation of an analog computer having an integrator including an amplifier and a feedback condenser connected across the amplifier, said integrator having an input and an output connected to the computer circuit, comprising means for rendering the condenser ineffective, means for disconnecting the output of the integrator from the computer and substituting a constant voltage of predetermined value in the computer circuit in place thereof, said last-mentioned means including a potentiometer connected to a source of constant voltage, and indicating apparatus adapted to be connected to the output of said integrator for measuring the output therefrom while said integrator is ineffective.

5. Apparatus for checking the operation of an electronic analog computer including an integrator, said integrator including an amplifier having an input and an output connected in the computer circuit and an integrating condenser interconnecting the input and output of the amplifier, which comprises a resistor, a relay operable to shift the input of the amplifier from the computer circuit to one side of the resistor, means adapted for supplying a predetermined voltage to the computer circuit, a second relay operable to shift the computer circuit connection from the output of the amplifier to the means for supplying a predetermined voltage and also to connect the said one side of the resistor to the input of the amplifier, a third relay operable to connect the other side of the resistor to the output of the amplifier, and voltage measuring means coupled to the output of said integrator.

6. Apparatus for checking the operation of an integrator as defined in claim 5 further comprising timing means for controlling the operation of the first mentioned relay for a predetermined time interval.

7. In an analog computer including an integrating circuit, said integrating circuit having input and output terminals coupled to the remaining elements of said analog computer for forming a closed-loop feedback system, the combination for testing the analog computer system comprising switching means coupled to said integrating circuit, said switching means opening the loop of the feedback system and rendering said integrating circuit ineffective, means supplying a fixed voltage to the opened-loop system, said fixed voltage being translated through said opened-loop system to the input of said integrating circuit, and means coupled to the opened-loop system for measuring the voltage appearing at the input of said integrating circuit.

8. In an analog computer including an integrating circuit having an amplifier with input and output terminals and a common terminal, said integrating circuit including condenser means coupled between the input and output terminals of said amplifier and further including an input resistor coupled in series with the input of said amplifier, said integrating circuit being coupled to the remaining elements of said analog computer for forming a closed-loop feedback system, the combination for testing the analog computer system comprising shunt resistor means, switching means coupled to said integrating circuit and said shunt resistor means, said switching means opening the loop of the feedback system and coupling said shunt resistor means across said condenser means, means supplying a fixed voltage to the opened-loop system, said fixed voltage being translated through said opened-loop system to the input of said integrating circuit, and means coupled to the opened-loop system for measuring the voltage appearing between the input terminal of said input resistor and said common terminal.

9. The apparatus as defined in claim 8 wherein said switching means disconnects the output of said amplifier from the remaining elements of said analog computer.

10. The apparatus as defined in claim 9 wherein said switching means coupling said shunt resistor means across said integrating condenser converts said integrating circuit into a negative feedback amplifier circuit having a predetermined gain, and wherein said means coupled to the opened-loop system for measuring the voltage appearing between the input terminal of said input resistor and said common terminal includes voltage measuring means coupled to the output terminals of said negative feedback amplifier circuit.

11. In an analog computer system having a plurality of integrating circuits, said integrating circuits each having an input and an output, the combination for testing each of said plurality of integrating circuits comprising switching means coupled to each of said plurality of integrating circuits, said switching means being adapted for coupling a known voltage to the input of each integrating circuit, means coupled to said switching means for automatically controlling the time interval that the known voltage is coupled to the input of each of said integrating circuits, and measuring means adapted to be coupled to the output of each integrating circuit for measuring the output voltage therefrom following said time interval.

12. In an analog computer system including at least one integrating circuit, said integrating circuit having an input adapted to be coupled to first terminal means of the remaining elements of said computer and having an output adapted to be coupled to second terminal means of the remaining elements of said computer for forming a closed-loop system, the combination for testing the remaining elements of said computer comprising means including switching means and a source of known voltage coupled to said analog computer system for supplying a known voltage to said second terminal means, said known voltage being translated through the remaining elements of said analog computer to said first terminal means, and measuring means including amplifier means coupled to said first terminal means for measuring the response of the remaining elements of said analog computer to said known voltage.

13. Apparatus for testing an analog computer including at least one integrating circuit, said integrating circuit having an input coupled to first terminal means of the remaining elements of the computer and an output coupled to second terminal means of the remaining elements of the computer to form a closed-loop system, the input of said integrating circuit including a series input resistor, comprising in combination, means including switching means coupled to said integrating circuit, a source of known voltage coupled to said switching means, said switching means rendering said integrating circuit ineffective and supplying a known voltage to said second terminal means of the computer, said known voltage being translated through the remaining elements of the computer to the series input resistor of said integrating circuit, and measuring means including amplifier means coupled to said series input resistor for measuring the response of the remaining elements of the computer to said known voltage.

14. The apparatus for testing an analog computer as defined by claim 13 wherein said amplifier means associated with said measuring means forms a part of said integrating circuit.

References Cited in the file of this patent

"Electronic Analog Computers" (Korn and Korn), published by McGraw-Hill Book Co., New York, 1952, pp. 291, 325, and 326.

Project Cyclone Symposium II on Simulation and Computing Techniques, Part 2, April 28–May 2, 1952, New York city, Reeves Instrument Corp., pages 147–154.